No. 875,883.
PATENTED JAN. 7, 1908.
L. F. ADT.
LENS MOUNT FOR EYEGLASSES.
APPLICATION FILED MAR. 23, 1905.
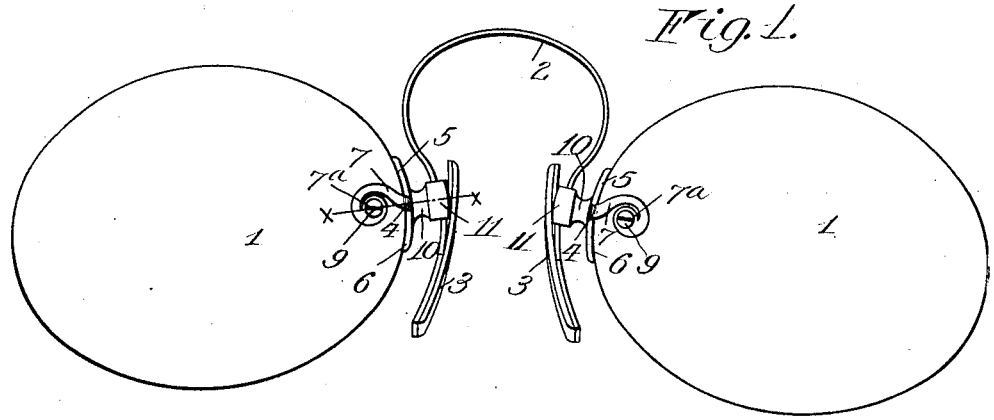
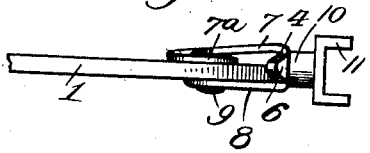
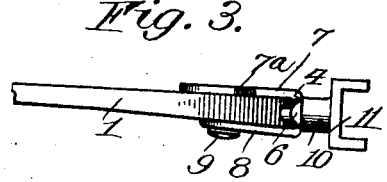
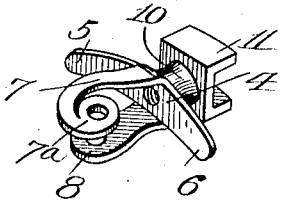
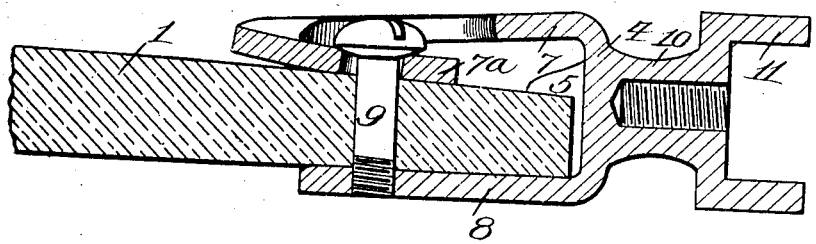

UNITED STATES PATENT OFFICE.

LEO F. ADT, OF TROY, NEW YORK.

LENS-MOUNT FOR EYEGLASSES.

No. 875,883.  Specification of Letters Patent.  Patented Jan. 7, 1908.

Application filed March 23, 1905. Serial No. 251,577.

*To all whom it may concern:*

Be it known that I, LEO F. ADT, of Troy, in the county of Rensselaer and State of New York, have invented certain new and useful Improvements in Lens-Mounts for Eyeglasses; and I do hereby declare the following to be a full, clear, and exact description of the same, reference being had to the accompanying drawings, forming a part of this specification, and to the reference-numerals marked thereon.

The object of my present invention is to provide an improved lens mount for attaching the mountings or other parts of eyeglasses and spectacles to the lenses whereby lenses of widely different thicknesses and curvatures may be readily accommodated by the same size mounts without disturbing the alinement of the fastening screw apertures of the mount and of the lens, and without sacrificing the strength and neat appearance of the mount.

To these and other ends the invention consists of certain improvements and combinations of parts all as will be hereinafter more fully explained, the novel features being pointed out in the claims at the end of the specification.

In the drawing: Figure 1 is a front view of a pair of eyeglasses to which my invention has been applied; Figs. 2 and 3 are detail views looking in the plane of the lenses and showing lenses of different thicknesses attached to the mounts; Fig. 4 is a perspective view of the mount removed from the lens; Fig. 5 is an enlarged sectional view on the line $x$—$x$ of Fig. 1 showing how the mount will adapt itself to lenses of different thicknesses and curvatures; and Fig. 6 is a diagram of a blank from which a lens mount may be constructed in accordance with my invention.

Lens mounts constructed in accordance with my invention are equally well adapted for attaching the mountings or other parts of eyeglasses or spectacles to the lenses, although in the present embodiment they are shown applied to the ordinary eyeglasses employing the lenses 1 connected by the bridge 2 and provided with the nose guards 3. The lens mounts for connecting the bridge and guards to the lenses in their present form comprise the body portion 4 having the upper and lower extensions 5 and 6 to engage the edge of a lens, and the front and rear arms 7 and 8 respectively for overlapping and engaging the opposite surfaces of the lens. These arms 7 and 8 are attached at one end to the body portion 4 of the mount and their opposite ends are free and provided with apertures to receive the lens fastening screw 9. One of these lens-attaching arms, preferably the forward arm 7 is so constructed that lenses of different thicknesses and curvatures may be accommodated between these attaching arms with ample security without destroying the registration of the fastening screw apertures of these attaching arms and of the lens, the apertures of the latter being spaced at a uniform distance from the adjacent edge of the lens, and this result I accomplish in the present instance by extending the arm 7 from the body portion of the mount to a point beyond the fastening screw aperture of the lens and of the arm 8, and then bending or doubling it back to the aperture, forming virtually the securing portion $7^a$ attached to the free end of the arm 7 and extending toward the point of attachment of the latter, the portion $7^a$ being formed to receive the usual screw or other fastening device 9 and adapted to engage one of the surfaces of the lens.

As the attaching arm 7 is preferably composed of pliable or yielding material, the application of a previously apertured lens between the attaching arms of the mount and the setting up of the fastening screw 9 will cause the attaching arms 7 and 8 to engage the opposite faces of the lens, the securing portion $7^a$ with which the fastening screw coöperates and which is attached to the arm 7 at a point beyond the screw apertures of the lens and mount being free to take up a position against the adjacent face of the lens although the lenses may be of different thicknesses and the surfaces thereof of varying curvatures.

The register or alinement of the screw apertures of the arms 7 and 8 with the corresponding aperture of the lens is not disturbed when the mount is applied to comparatively thin lenses, as the securing portion $7^a$ in being drawn against the adjacent surface of the lens by the fastening screw will cause a bending action at a point inwardly beyond the attaching screw and the arm 7 will bend or move about an outer point in proximity to the body portion 4 of the mount and at a point upon the opposite side of the fastening screw, and consequently the lateral motion in one direction caused by the bending of one portion of the arm will be compensated for and equalized by the lateral motion in an opposite direction caused by the bending of the other portion thereof. It is preferable to form one of the attaching arms adjustable in the manner described, and to employ the additional arm 8 for the opposite side of the lens for this enables the arm 8 to be made comparatively stiff to afford ample strength to resist lateral bending between the lens and the mount, and in applying the mount to the lenses it is preferable to apply the adjustable arm 7 to the front face of the lenses particularly when applied to periscopic and toric lenses wherein the curvature of the front surface is on a shorter radius than that of the rear surface, and therefore the adjustable arm may more readily adapt itself to the contour of the lens.

A lens mount of the kind described may be readily and cheaply formed mainly from a blank of sheet material, the body portion 4 with the extensions 5 and 6 being shaped to conform substantially to the contour of the lens edge, the arms 7 and 8 being bent at right angles from the opposite edges of the body portion in substantially parallel directions to receive a portion of a lens between them, and in the present embodiment the adjustable arm 7 is substantially the shape of a scroll or spiral, and this is generally preferable as it readily adapts itself to the shape and thickness of the lens and presents an ornamental and neat appearance. The usual post 10 carrying the box 11 for the attachment of the bridge and guards is provided on the body portion 4 of the mount when the device is employed in connection with eyeglasses, or when the invention is applied to rimless spectacles, the body portion 4 of the mount is provided with the usual temple clasps, bridges or other parts in the well known way by means of which these parts may be attached in the best manner to the lenses.

I claim as my invention:

1. In eyeglasses, the combination with a lens having an aperture therein for the fastening device, of a lens mount comprising a body portion and an attaching arm connected to the body portion and having a lens securing portion attached thereto at a point beyond the lens aperture and extending toward said aperture, and a fastening device cooperating with the securing portion to draw it against the lens surface.

2. In eyeglasses, the combination with a lens having an aperture therein for the fastening device, of a lens mount comprising a body portion and the attaching arms for engaging the surfaces of the lens, one of said arms being extended beyond the lens aperture and then doubled back to receive the fastening device.

3. In eyeglasses, the combination with a lens having an aperture near one edge thereof for the fastening device, of a lens mount comprising a body portion arranged at the lens edge, and an arm extending inwardly from the body portion to a point beyond the lens aperture and having a securing portion extending back to the said aperture, and a fastening device cooperating with the securing portion of the arm to secure it to the lens.

4. In eyeglasses, the combination with a lens having an aperture near its edge for the fastening device, of a lens mount comprising the body portion arranged at the lens edge, and the apertured attaching arms attached thereto and overlapping the opposite faces of the lens, one of said arms extending inwardly over the lens and beyond the lens aperture and having a securing portion attached thereto at a point beyond the lens aperture and extending back to the lens aperture, and a fastening device cooperating with the attaching arms for securing them to the lens.

5. In eyeglasses, the combination with a lens having an aperture near its edge for the fastening device, of a lens mount comprising a body portion arranged at the lens edge and an attaching arm extending inwardly from the body portion and having a securing portion of spiral form extending to the lens aperture, and a fastening device cooperating with the securing portion to secure it to the lens.

6. In eyeglasses, the combination with a lens having an aperture near its edge for the fastening device, of a lens mount composed of a blank of sheet material embodying a body portion having the lateral lens edge-bearing extensions, and the attaching arms extending in opposite directions at either side of the extensions, one of the arms being formed with a securing portion doubled edgewise thereof.

7. The combination with a lens having an aperture near one edge, of a securing device embodying a body portion having an apertured arm extending over one face of the lens, a securing portion arranged on the opposite side of the lens, and a flexible supporting arm on the body carrying said securing portion and attached to the edge thereof farthest removed from the lens edge.

LEO F. ADT.

Witnesses:
MICHAEL F. O'CONNOR,
H. D. BAILEY.